(12) United States Patent
Rodriguez Bravo et al.

(10) Patent No.: US 10,885,725 B2
(45) Date of Patent: Jan. 5, 2021

(54) IDENTIFYING A DRIVING MODE OF AN AUTONOMOUS VEHICLE

(71) Applicant: International Business Machines Corporation, Armonk, NY (US)

(72) Inventors: Cesar Augusto Rodriguez Bravo, Alajuela (CR); Edgar Adolfo Zamora Duran, Heredia (CR); John Richard Feezell, Pikeville, TN (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 16/355,904

(22) Filed: Mar. 18, 2019

(65) Prior Publication Data

US 2020/0302702 A1 Sep. 24, 2020

(51) Int. Cl.
*G07C 5/00* (2006.01)
*G05D 1/00* (2006.01)

(52) U.S. Cl.
CPC ........... *G07C 5/008* (2013.01); *G05D 1/0061* (2013.01); *G05D 2201/0213* (2013.01)

(58) Field of Classification Search
CPC ................ G07C 5/008; G05D 1/0061; G05D 2201/0213
See application file for complete search history.

(56) References Cited

U.S. PATENT DOCUMENTS

| | | | |
|---|---|---|---|
| 8,140,358 B1 | 3/2012 | Ling et al. | |
| 8,595,037 B1 | 11/2013 | Hyde et al. | |
| 8,676,466 B2 * | 3/2014 | Mudalige | G08G 1/22 370/252 |
| 8,744,642 B2 | 6/2014 | Nemat-Nasser et al. | |
| 8,818,608 B2 | 8/2014 | Cullinane et al. | |
| 9,720,410 B2 * | 8/2017 | Fairfield | G05D 1/0027 |
| 9,792,656 B1 | 10/2017 | Konrardy et al. | |
| 9,805,423 B1 | 10/2017 | Konrardy et al. | |
| 10,163,069 B2 * | 12/2018 | Borley | G06Q 10/0833 |
| 10,246,097 B1 * | 4/2019 | Fields | G06Q 30/0217 |
| 10,501,055 B1 * | 12/2019 | Yi | H04L 9/0891 |
| 10,647,297 B2 * | 5/2020 | Watanabe | B60R 25/241 |
| 10,723,362 B2 * | 7/2020 | Dotzler | G05D 1/0088 |

(Continued)

FOREIGN PATENT DOCUMENTS

| | | |
|---|---|---|
| EP | 0087398 A2 | 8/1983 |
| WO | 2018099876 A1 | 6/2018 |

OTHER PUBLICATIONS

Libicki, M., "The Police Could Be Controlling Your Self-Driving Car", TheRANDBlog, printed Jan. 15, 2019, 3 pages https://www.rand .org/blog/2016/04/the-police-could-be-controlling-your-self-driving-car.html.

(Continued)

*Primary Examiner* — Ryan W Sherwin
(74) *Attorney, Agent, or Firm* — James L. Olsen

(57) ABSTRACT

Aspects of the present disclosure relate to identifying a driving mode of an autonomous vehicle. A driving mode of an autonomous vehicle is determined by one or more processing circuits of the autonomous vehicle, the driving mode representing an amount of autonomy of the autonomous vehicle at a particular time. A request for the driving mode of the autonomous vehicle is received from a requesting device. The driving mode is then transmitted to the requesting device.

17 Claims, 7 Drawing Sheets

(56) References Cited

U.S. PATENT DOCUMENTS

| | | | | |
|---|---|---|---|---|
| 10,732,629 | B2* | 8/2020 | Ferguson | G01C 21/3453 |
| 2007/0299631 | A1 | 12/2007 | Macbeth et al. | |
| 2018/0188731 | A1* | 7/2018 | Matthiesen | G05D 1/0088 |
| 2018/0348759 | A1* | 12/2018 | Freeman | G01C 21/3415 |
| 2019/0049988 | A1* | 2/2019 | Meij | G05D 1/0274 |
| 2019/0212725 | A1* | 7/2019 | Woodrow | G08G 1/22 |

OTHER PUBLICATIONS

Soulskill, "When Should Cops Be Allowed to Take Control of Self-Driving Cars?", Slashdot, posted Aug. 26, 2015, printed Mar. 15, 2019, 20 pages https://tech.slashdot.org/story/15/08/26/0317216/when-should-cops-be-allowed-to-take-control-of-self-driving-cars.

Bigelow, P., "On the Path to Autonomous Vehicles, Police Officers Get Left Behind", Apr. 27, 2017, 12 pages https://www.caranddriver.com/news/a15341586/on-the-path-to-autonomous-vehicles-police-officers-get-left-behind/.

Lambert, F., "Uber self-driving prototype rolls over after crash in Arizona, police says Uber is not at fault [Updated]", Mar. 25, 2017, 4 pages https://electrek.co/2017/03/25/uber-self-driving-prototype-accident-arizona/.

Stevenson, J., "Why is the black box not stored in the cloud?", Jun. 6, 2016, 6 pages https://phys.org/news/2016-06-black-cloud.html.

Gerbis, N, "Should black box data be stored in the cloud?", printed Jan. 15, 2019, 5 pages https://science.howstuffworks.com/transport/flight/modern/black-box-data-stored-in-cloud.htm.

Stevenson, J., "Why is the black box not stored in the cloud?", First published Friday, Jun. 3, 2016, 6 pages https://www.city.ac.uk/news/2016/june/why-is-the-black-box-not-stored-in-the-cloud.

Galland, D., "10 Million Self-Driving Cars Will Hit the Road by 2020—Here's How to Profit", Mar. 3, 2017, 2 pages https://www.forbes.com/sites/oliviergarret/2017/03/03/10-million-self-driving-cars-will-hit-the-road-by-2020-heres-how-to-profit/#10ed14547e50.

Sung et al., "Driving Information Logger with In-Vehicle Communication for Autonomous Vehicle Research", International Conference on Advanced Communications Technology(ICACT), Feb. 11-14, 2018, 3 pages.

Mell et al., "The NIST Definition of Cloud Computing", Recommendations of the National Institute of Standards and Technology, Sep. 2011, 7 pages.

* cited by examiner

IDENTIFYING A DRIVING MODE OF AN AUTONOMOUS VEHICLE

BACKGROUND

The present disclosure relates to autonomous vehicles and, more specifically, to identifying a driving mode of an autonomous vehicle.

Autonomous vehicles are capable of traveling from a starting point to a destination with little to no user input. To achieve this, autonomous vehicles leverage sensor data from a variety of sensors to perceive their surroundings. Autonomous vehicles have a variety of benefits, including, among others, safety, efficiency, and customer satisfaction.

SUMMARY

Aspects of the present disclosure relate to a method, system, and a computer program product for identifying a driving mode of an autonomous vehicle. A driving mode of an autonomous vehicle can be determined by one or more processing circuits of the autonomous vehicle, the driving mode representing an amount of autonomy of the autonomous vehicle at a particular time. A request for the driving mode of the autonomous vehicle can be received from a requesting device. The driving mode can then be transmitted to the requesting device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
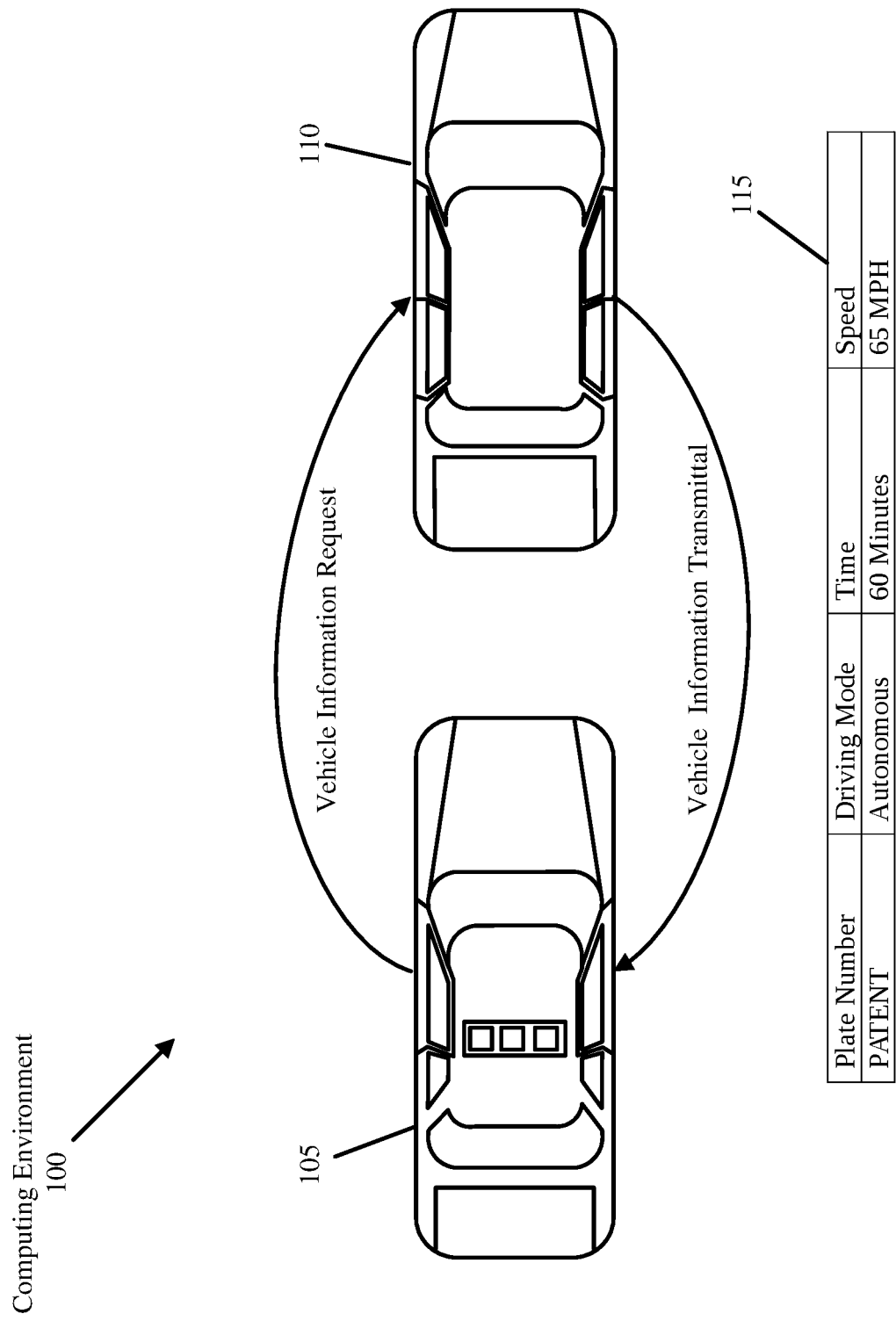
FIG. 1 illustrates a computing environment in which illustrative embodiments of the present disclosure can be implemented.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward autonomous vehicles, and more specifically, to identifying a driving mode of an autonomous vehicle. While the present disclosure is not necessarily limited to such applications, various aspects of the present disclosure may be appreciated through a discussion of various examples using this context.

As autonomous vehicles (e.g., self-driving cars) become more popular, there is speculation regarding how they will be governed. For example, it is unknown how law enforcement will handle autonomous vehicles during traffic stops. How does law enforcement know whether they are pursuing a manually-operated or autonomously-operated vehicle? Answering this question is key to determining whether a user is violating the law. For example, the user may attempt to deflect responsibility by alleging that the vehicle was under autonomous operation. Currently, there is no solution for identifying a driving mode of an autonomous vehicle.

Aspects of the present disclosure address the aforementioned complications by enabling the identification of a driving entity. A driving mode of an autonomous vehicle can be determined by one or more processing circuits of the autonomous vehicle, where the driving mode can be autonomous, manual, or hybrid. In embodiments, the driving mode can be identified by determining whether driving actions of the autonomous vehicle are being completed solely by the vehicle's computer (e.g., autonomous mode), by a user (e.g., manual mode), or partially by the vehicle's computer and partially by a user (e.g., hybrid mode). A request for the driving mode of the autonomous vehicle can then be received from a requesting device. The driving mode can then be transmitted to the requesting device.

This technique allows for rapid identification of a driving entity of an autonomous vehicle. For example, a law enforcement agency can readily ascertain who is controlling a vehicle to aid in decision making when determining how to proceed with, for example, a traffic stop. This improves the usability of autonomous cars insofar as the techniques described herein are incorporated in such autonomous cars. Further, the information regarding the driving modes engaged over time (e.g., which modes are engaged and how long they are engaged) can be stored in database over a network and used for other purposes (e.g., insurance rates, rental company rates, etc.).

The aforementioned advantages are example advantages, and embodiments exist that can contain all, some, or none of the aforementioned advantages while remaining within the spirit and scope of the present disclosure.

Referring now to FIG. 1, shown is a diagram of a computing environment 100 in which illustrative embodiments of the present disclosure may be implemented. The computing environment 100 includes a requesting vehicle 105 and an autonomous vehicle 110.

Consistent with embodiments of the present disclosure, the requesting vehicle 105 can request vehicle information 115 from the autonomous vehicle 110. As depicted in FIG. 1, the vehicle information 115 indicates, for example, the plate number, driving mode, time since the current driving mode was activated, and speed of the autonomous vehicle 110. In response to receiving the request for vehicle information 115, the autonomous vehicle 110 can transmit (e.g., using a wireless signal) the vehicle information 115 to the requesting vehicle 105. In this example, the autonomous vehicle 110 transmits the vehicle information 115 including the plate number "PATENT," the driving mode "autonomous," the time spent in the autonomous driving mode "60 minutes," and the current speed "65 mph."

The driving mode can indicate whether the vehicle is being operated manually (e.g., by a human being), autonomously (e.g., by the vehicle's computer), or in between (e.g., some actions are completed by a human being while others are completed by the vehicle's computer). As discussed herein, "hybrid driving mode" refers to a driving mode where some driving actions are initiated by a human being while others are initiated by one or more processing circuits of a vehicle. For example, if a user engages cruise control, the user is in control of steering while the vehicle is in control of throttle. This is an example of the hybrid driving mode. It is appreciated that a hybrid driving mode may be more or less autonomous (e.g., nearly entirely autonomous or nearly entirely manual).

As discussed herein, "driving actions" refer to actions required for a vehicle to travel from a starting point to an end point (e.g., a destination). These actions can include steering, throttling, braking, routing, and transmission actions (e.g., changing gears, putting a vehicle into park, etc.). Driving actions do not refer to actions which are not required to reach an endpoint destination, such as audio adjustment (e.g., radio selection, volume adjustment, input selection, etc.), sunroof control, seat adjustment, cooling/heating adjustment, airflow adjustment, lighting adjustment, wiper adjustment, etc.

In embodiments, vehicle information 115 can include more or less information than the information shown in FIG. 1. For example, the vehicle information 115 can include a vehicle identification number (VIN), a make/model of the vehicle, personal data of one or more individuals associated with the vehicle (e.g., identified on the title of the vehicle), total driving time, insurance information, routing information (e.g., mapping and navigation data), and the like.

In some embodiments, the vehicle information 115 can be transmitted in a standardized format. For example, the vehicle information can include the following format: "Plate Number-Driving Mode-Timer-Timer Unit-Speed-Speed Unit." Following the example depicted in FIG. 1, using this format, the transmission can be "PA73N7-10-60-2-65-4," where PA73N7 corresponds to the plate number, 10 corresponds to the autonomous driving mode, 60 corresponds to the timer value, 2 corresponds to the minute unit, 65 corresponds to the speed value, and 4 corresponds to the miles per hour (mph) unit. The standardized code for the vehicle information 115 can be formatted in any suitable manner. Additional fields can be appended to the code based on additional data present in the vehicle information 115. Mapping of code numbers to fields (e.g., the number 10 mapped to the field "autonomous") can be completed in any manner. Encoding the information condenses the data such that less data is required to be transmitted between the requesting vehicle 105 and autonomous vehicle 110. This can be particularly useful when using wireless communication techniques (e.g., long range radiofrequency identification (RFID)) with limited bandwidth.

In embodiments, the requesting vehicle 105 can be a law enforcement agency (e.g., state police, federal police, local law enforcement, etc.) which requests the vehicle information 115 to ensure a user of the autonomous vehicle 110 is safe and compliant with the law. In some embodiments, the requesting vehicle 105 can be another entity with an interest in identifying a driving entity of a nearby autonomous vehicle. For example, the requesting vehicle 105 may be owned by an individual who exercises additional caution near manually-operated (e.g., or automatically operated) vehicles. However, in embodiments, users opt-in to the system such that they are aware of who can access their vehicle information. In embodiments, the requesting vehicle 105 is required to authenticate (e.g., using password) with the autonomous vehicle 110 prior to requesting the vehicle information 115.

Upon receiving the vehicle information 115 from the autonomous vehicle 110, the requesting vehicle 105 may review the vehicle information 115 to determine the driving mode of the autonomous vehicle, as well as any other addition information included in the vehicle information 115.

In embodiments, the functionality of the requesting vehicle 105 can be completed by a separate device (e.g., a laptop computer, mobile device, wearable, etc.). For example, a mobile device associated with an individual of the requesting vehicle 105 can be configured to request and receive the vehicle information 115 from the autonomous vehicle 110.

FIG. 1 is intended to represent the major components of an example computing environment according to embodiments of the present disclosure. In some embodiments, however, individual components can have greater or lesser complexity than shown in FIG. 1, and components other than, or in addition to those shown in FIG. 1 can be present. Furthermore, in some embodiments, various components illustrated in FIG. 1 can have greater, lesser, or different functionality than shown in FIG. 1. Further still, aspects of the present disclosure exist comprising only a subset of the components illustrated while remaining within the spirit and scope of the present disclosure. As one example, in some embodiments, vehicle information 115 can include addition information such as insurance information, routing information (e.g., mapping and navigation data), and personal data (e.g., a user's name, address, weight, height, etc.). Additional information can aid during traffic stops, such that a law enforcement agency can acquire all required information without exiting their vehicle.

Though this disclosure pertains to the collection of personal data, it is noted that in embodiments, users opt-in to the system. In doing so, they are informed of what data is collected and how it will be used, that any collected personal data may be encrypted while being used, that the users can opt-out at any time, and that if they opt-out, any personal data of the user is deleted.

Figure 2:
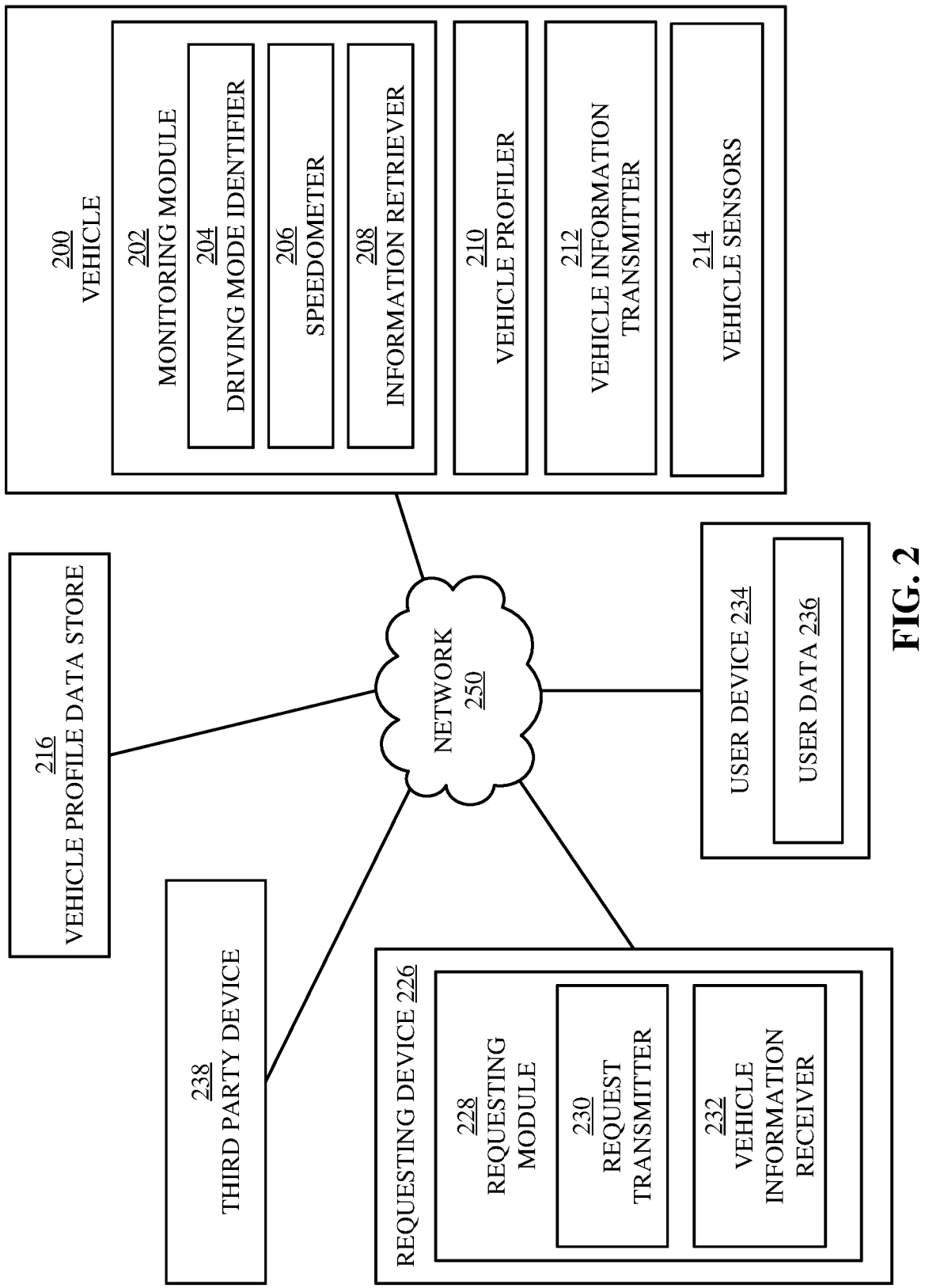
FIG. 2 illustrates a block diagram of an example Internet of Things (IoT) environment in accordance with some embodiments of the present disclosure.

Referring now to FIG. 2, illustrated is a block diagram of an example Internet of Things (IoT) environment according to aspects of the present disclosure. The IoT environment can include numerous components communicatively coupled by a network 250 such as, but not limited to, a vehicle 200, a vehicle profile data store 216, a requesting device 226, a user device 234, and a third party device 238.

Vehicle 200 can comprise a semi-autonomous or fully autonomous vehicle, each possibly capable of fully manual operation according to various embodiments. Vehicle 200 can be a sedan, sport-utility-vehicle (SUV), truck, bus, all-terrain vehicle (ATV), aerial vehicle (e.g., plane, helicopter, quadcopter, etc.), train, ship (e.g., ferry, cruise liner, etc.), or a different form of vehicular transport.

Vehicle 200 can include a monitoring module 202 configured to collect data associated with the vehicle 200. The data collected by the monitoring module 202 can be used to generate vehicle information (e.g., vehicle information 115 of FIG. 1) that may be stored in a vehicle information data store which can be transmitted upon request or stored for later use (e.g., by a vehicle profiler 210). In particular, the monitoring module 202 includes a driving mode identifier 204 configured to determine a driving mode of the vehicle 200 (e.g., the driving mode as discussed above), a speedometer 206 configured to determine a speed of the vehicle 200, and an information retriever 208 configured to retrieve and store additional information (e.g., user identity information, insurance information, mapping and navigation information, etc.) associated with the vehicle 200.

Although monitoring module 202 is shown within vehicle 200, monitoring module 202 can likewise be communicatively coupled to, but physically removed from, vehicle 200. For example, in some embodiments, aspects of monitoring module 202 can be provided as a service to vehicle 200 and utilize existing technology within vehicle 200 such as a display interface, autonomous or semi-autonomous driving technology, speakers, and other aspects of vehicle 200 to provide aspects of monitoring module 202. In some embodiments, monitoring module 202 comprises a discrete unit (e.g., a hardware controller) physically integrated into vehicle 200 (e.g., integrated into the vehicle during assembly, or attached as an after-market accessory).

The driving mode identifier 204 can be configured to determine a current driving mode (e.g., manual, hybrid, or autonomous) of the vehicle 200. This can be completed in a variety of manners. In some embodiments, the driving mode identifier 204 can be configured to determine the driving mode based on a driving mode selected by a user. For example, in response to selection of the autonomous driving mode (e.g., via a button on a graphical user interface (GUI), via a button on the console, via a switch on the steering wheel, etc.) by a user, the driving mode identifier 204 can determine that the driving mode is "autonomous." This can similarly be completed for manual and hybrid driving modes. As an example, if a user selects the manual driving mode while driving, the driving mode identifier 204 can be configured to determine the driving mode is "manual." If, while in the manual driving mode, the user activates an option which places the vehicle under semi-autonomous control (e.g., steering control, cruise control, etc.), the driving mode identifier 204 can be configured to determine the driving mode is "hybrid." After the driving mode is determined by the driving mode identifier 204, it is stored in memory (e.g., non-volatile memory on the vehicle 200). Time stamps for driving mode selections and transitions can also be stored within memory.

In some embodiments, the driving mode identifier 204 can be configured to monitor actions executed by one or more processing circuits in the vehicle 200 to identify the driving mode. For example, the driving mode identifier 204 can be configured to determine whether the processing circuits of the vehicle 200 are executing all, some, or none of driving actions required to reach a particular destination. As an example, if the driving mode identifier 204 determines that all driving actions required to reach a particular destination are completed by one or more processing circuits of the vehicle 200, a determination can be made that the driving mode is "autonomous." In contrast, if the driving mode identifier 204 determines that the processing circuits of the vehicle 200 are only controlling the throttle of the vehicle, and all other actions are being executed based on user input (e.g., the user is manually steering, shifting gears, and braking), then a determination can be made that the vehicle 200 is in the hybrid driving mode. If the driving mode identifier 204 determines that all driving actions are being completed based on user input, then a determination can be made that the vehicle is in the manual driving mode.

In embodiments, differentiating between vehicle 200 processing circuit control and manual control can be completed based on the observance of analogue and/or digital signals. Analogue signals are typically transmitted in response to user input. These analogue signals can be transmitted to one or more processing circuits of a vehicle and processed thereafter. In contrast, during autonomous control, processing circuits of a vehicle typically only receive/transmit digital signals. Accordingly, manual vs. autonomous control can be differentiated by monitoring analogue and/or digital signals received by and/or issued from the processing circuits of the vehicle 200, in embodiments in which this type of delineation is possible. For example, if an analogue signal, resulting from a user pressing an acceleration pedal, is transmitted to one or more processing circuits of the vehicle 200, a determination can be made that the vehicle's throttle is under manual control. In contrast, if acceleration of the vehicle 200 is completed solely based on digital signals issued by one or more processing circuits of the vehicle 200, then a determination can be made that the vehicle's throttle is under autonomous control.

In some embodiments, the driving mode identifier 204 can identify the driving mode based on the collection of sensor data from one or more vehicle sensors 214. To facilitate autonomous driving, various vehicle sensors 214 continuously collect sensor data such that the vehicle 200 can be controlled (e.g., using proportional-integral-derivative (PID) control). The vehicle sensors 214 can include, but are not limited to, radar, computer vision, lidar, sonar, global positioning system (GPS), odometry, and inertial measurements. In embodiments, particular sensor data may be required to execute particular driving actions. For example, GPS may be required for routing control, lidar may be required for steering control, and odometry may be required for throttle control. Accordingly, by analyzing the active sensors on the vehicle (e.g., the sensor data currently being collected), the driving mode can be determined by the driving mode identifier 204. As an example, if all sensors on a vehicle are collecting data, a determination can be made that the vehicle is in autonomous mode. As another example, if only odometry sensor data is being collected, then a determination can be made that the vehicle is in hybrid mode. If autonomous driving mode sensor data is not being collected, then the driving mode identifier 204 can determine that the vehicle 200 is in manual mode.

In some embodiments, the driving mode identifier 204 can be configured to identify the driving mode of the vehicle 200 based on interaction with one or more actuators within the vehicle 200. For example, if a user engages the brakes (e.g., activates a brake pedal switch) or clutch (e.g., activates a clutch pedal switch), the driving mode can be dynamically updated. In this example, in response to the user braking or engaging the clutch, a determination can be made that the driving mode has transitioned to hybrid or manual mode (e.g., depending on how many driving actions are still being automatically completed).

In embodiments, the driving mode identifier 204 can be configured to record timing information associated with each driving mode recordation or transition. For example, the driving mode identifier 204 can be configured to track the amount of time the vehicle 200 is engaged in each driving mode (e.g., by time stamping each driving mode determination and storing this information in non-volatile memory on the vehicle 200).

The speedometer 206 can be configured to determine a speed of the vehicle 200. The speedometer 206 can measure speed using various methods known in the art. For example, the speedometer 206 can include a rotational sensor mounted in the transmission which delivers a series of electronic pulses whose frequency corresponds to the rotational speed of the drive shaft, and thus the vehicle's speed. However, any other suitable speed measurement technique consistent with embodiments of the present disclosure can be used. In embodiments, the speedometer 206 technology can depend on the particular type of vehicle (e.g., a boat vs. an airplane vs. a car).

The information retriever 208 can be configured to retrieve various information relating to the vehicle 200. For example, the information retriever 208 can acquire user data 236 from the user device 234 over the network 250. The user data 236 can, in some embodiments, include personal data (e.g., age, height, weight, hair color, address, etc.), insurance data (e.g., an insurance company, an insurance policy number, etc.), mapping and navigation data, vehicle information (e.g., a vehicle make/model, VIN number, plate number, odometer reading, etc.), etc. This data can be collected directly from memory on the user device 234 or from one or more applications operating on the user device 234. In some embodiments, the information retriever 208 can collect information from memory located within the vehicle 200. In some embodiments, the information retriever 208 can be configured to receive user input (e.g., via a graphical user interface (GUI)), such that a user can manually input information into the monitoring module 202.

Upon determining the driving mode by the driving mode identifier 204, determining the vehicle 200 speed via the speedometer 206, and determining addition information via the information retriever 208, a vehicle information data store can be generated. The vehicle information data store can be the same as, or substantially similar to, the vehicle information 115 of FIG. 1. The vehicle information can be transmitted to one or more additional devices upon request.

The requesting device 226 includes a requesting module 228 configured to transmit requests by a request transmitter 230 and receive vehicle information by a vehicle information receiver 232. In embodiments, the requesting device 226 may only transmit vehicle information requests in response to abnormal or unlawful behavior by the vehicle 200. Once the request transmitter 230 issues a request to the vehicle 200 over the network 250, a vehicle information transmitter 212 dispatches the vehicle information generated by the monitoring module 202 to the requesting device 226.

A vehicle profiler 210 of the vehicle 200 can be configured to generate a vehicle profile for the vehicle 200. The vehicle profile can store historical data regarding the vehicle's driving mode use over time. For example, the vehicle profile can include the time spent in each driving mode (e.g., per trip or on average), the number of times each mode is activated, and the conditions in which each mode is used (e.g., based on location, time of day, speed, etc.). The vehicle profiler 210 can dispatch the vehicle profile to the vehicle profile data store 216 over the network 250. The vehicle profile data store 216 can include vehicle profiles for a plurality of vehicles, including each vehicle's driving mode use over time.

In embodiments, the vehicle profiles stored in the vehicle profile data store 216 can be referenced by the third party device 238. For example, in embodiments, the vehicle 200 may be a rental car which is rented out by a third party (in control of the third party device 238). In these embodiments, the rental car company may set rates based on information contained in the vehicle profiles (stored in the vehicle profile data store 216), including particular driving modes. For example, assume the rental car company sets a low rate for autonomous driving, a medium rate for autonomous/hybrid driving, and a high rate for manual driving. The third party device 238 associated with the rental car company can then request a vehicle profile corresponding to the rented vehicle to determine which rate to charge the renter. In this example, if the rental company determines that the renter engaged the manual driving mode (e.g., beyond a predetermined time period or at a particular speed), the rental company can charge the renter for the manual driving mode rate. This can similarly be completed for any other vehicle information (e.g., the speed at which the vehicle is operated at, the mileage of the vehicle, the users operating the vehicle, the make/model of the vehicle, etc.).

As another example, an insurance company may be a third party with an interest in the information contained in the vehicle profile data store 216. In these embodiments, when appropriate user consent is provided, the insurance company may access the vehicle profile data store 216 to determine which rates to charge particular users based on corresponding vehicle profiles. For example, insurance rates may be relatively inexpensive for autonomously operated vehicles, and more expensive for manually operated vehicles. In these embodiments, the insurance company can set rates dependent on the driving mode operation data (e.g., the time period spent in each driving mode, where each driving mode is activated, the time of day each driving mode is activated, etc.).

Network 250 can comprise any physical or virtual network, including Wi Fi, broadband, cellular, short-range, and/or other networks. Although a single network is shown, multiple similar or dissimilar sub-networks may likewise be used to continuously or intermittently connect various components illustrated in FIG. 2. In some embodiments, components shown in FIG. 2 may communicate via ANT/ANT+, Bluetooth, cellular (e.g., 3G, 4G, 5G, etc.), infrared, 6LoW-PAN, ultra-wideband (UWB), long range RFID, Wi Fi, wirelessHART, and/or WirelessHD protocols. Further, in embodiments, data (e.g., vehicle information, user data, vehicle profiles, etc.) can be encrypted (e.g., using one or more cryptographic hash functions) prior to transmission such that various communication mechanisms can be used without putting the data at risk.

FIG. 2 represents the major components of an example IoT environment according to embodiments of the present disclosure. In some embodiments, however, individual components can have greater or lesser complexity than shown in FIG. 2, and components other than, or in addition to those shown in FIG. 2 can be present. Furthermore, in some embodiments, various components illustrated in FIG. 2 can have greater, lesser, or different functionality than shown in FIG. 2. Further still, aspects of the present disclosure exist comprising only a subset of the components illustrated while remaining within the spirit and scope of the present disclosure. As an example, multiple vehicles may be communicatively coupled to a single requesting device.

In embodiments, functionalities of the monitoring module 202, vehicle profiler 210, vehicle information transmitter 212, and requesting module 228 can be processor executable instructions that can be executed by a dedicated or shared processor using received inputs.

Figure 3:
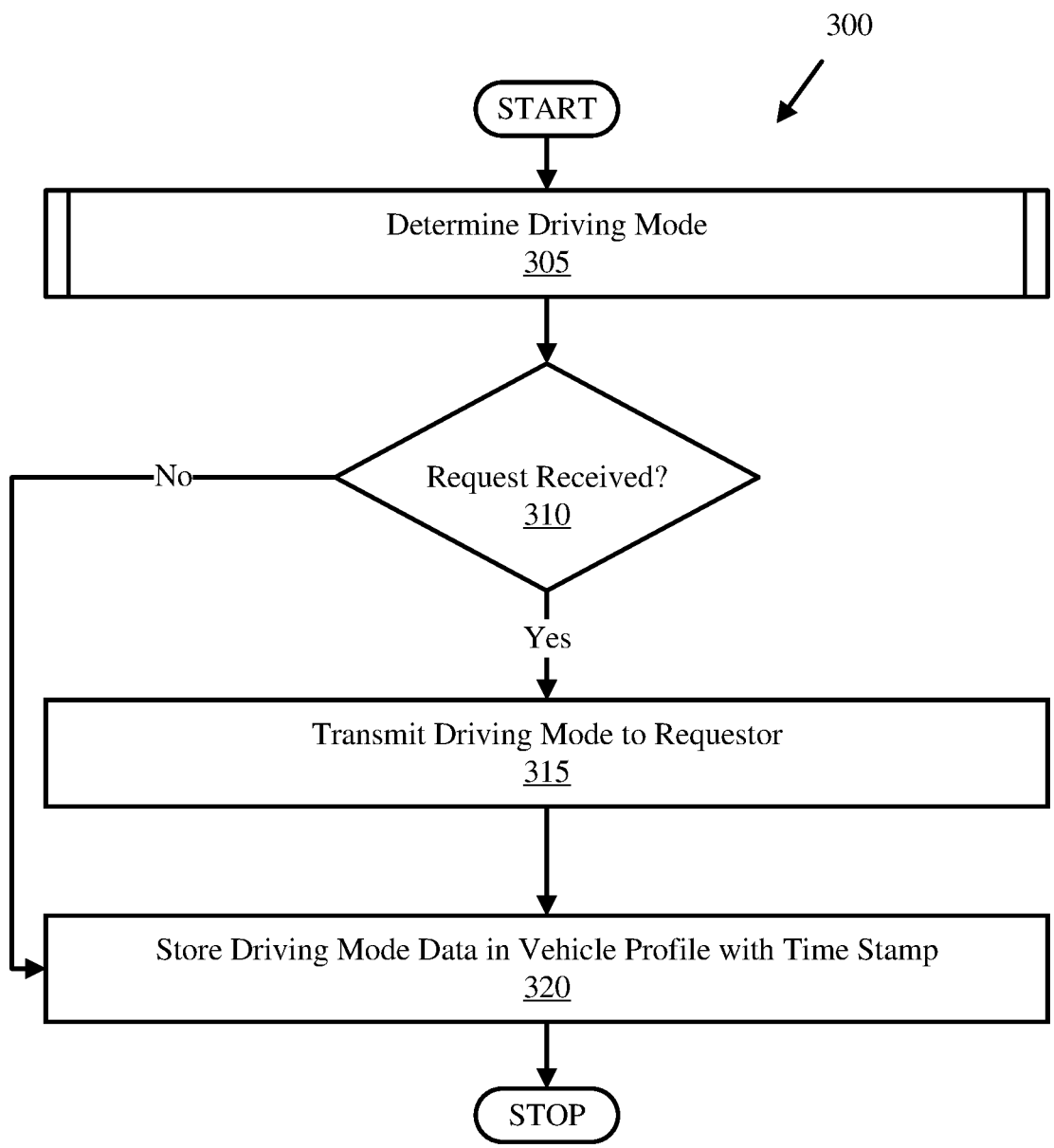
FIG. 3 is a flow diagram illustrating an example method for identifying a driving mode of an autonomous vehicle, in accordance with embodiments of the present disclosure.

Referring now to FIG. 3, shown is a flow diagram illustrating an example method 300 for identifying a driving mode of an autonomous vehicle, in accordance with embodiments of the present disclosure.

Method 300 initiates at operation 305, where a driving mode is determined. The driving mode can be determined in the various manners described with respect to FIG. 2 (e.g., by the driving mode identifier 204). For example, the driving mode can be determined based on manual mode selection, by analyzing which actions are performed by the vehicle's computer (e.g., based on the observation of analogue and/or digital signals received by or issued from the vehicle's processing circuits), based on interaction with actuators, and/or based on the collection of sensor data. An example method for determining a driving mode of an autonomous vehicle is depicted as method 400 in FIG. 4. As such, operation 305 is depicted as a subprocess within FIG. 3 (though the manner in which the driving mode is determined does not necessarily have to be completed using method 400).

In embodiments, after the driving mode is determined, the driving mode is stored in a vehicle information data store (e.g., vehicle information 115 of FIG. 1). The vehicle information data store can include additional information such as personal data, the make/model of the vehicle, a VIN number, insurance information, a current speed of the vehicle, routing information (e.g., the current path to the vehicle's destination), the time spent in the current driving mode, etc.

A determination is then made whether a request for the driving mode is received (e.g., over a network). This is illustrated at operation 310. If a determination is made that the request for the driving mode is received (operation 310: YES), then the driving mode is transmitted to the requestor. This is illustrated at operation 315. For example, the response to the request can indicate whether the vehicle is in the autonomous, hybrid, or manual driving mode. In some embodiments, additional information can be transmitted along with the driving mode. For example, if the driving mode is stored in a vehicle information data store (e.g., vehicle information 115 of FIG. 1), the information stored in the vehicle information data store can be transmitted to the requestor.

If a determination is made that the request for the driving mode is not received (operation 310: NO), then the driving mode can be stored in a vehicle profile with a time stamp. This is illustrated at operation 320. The conditions in which each driving mode is initiated/engaged can also be stored within the vehicle profile. For example, the duration spent in each driving mode, the time of day each driving mode was initiated, the location in which each driving mode was initiated, weather conditions in which each driving mode initiated (e.g., received by a separate application), and whether each driving mode is initiated on high-ways vs. streets can all be stored within the vehicle profile.

The aforementioned operations can be completed in any practical order and are not limited to those described. Additionally, some, all, or none of the aforementioned operations can be completed, while still remaining within the spirit and scope of the present disclosure.

Figure 4:
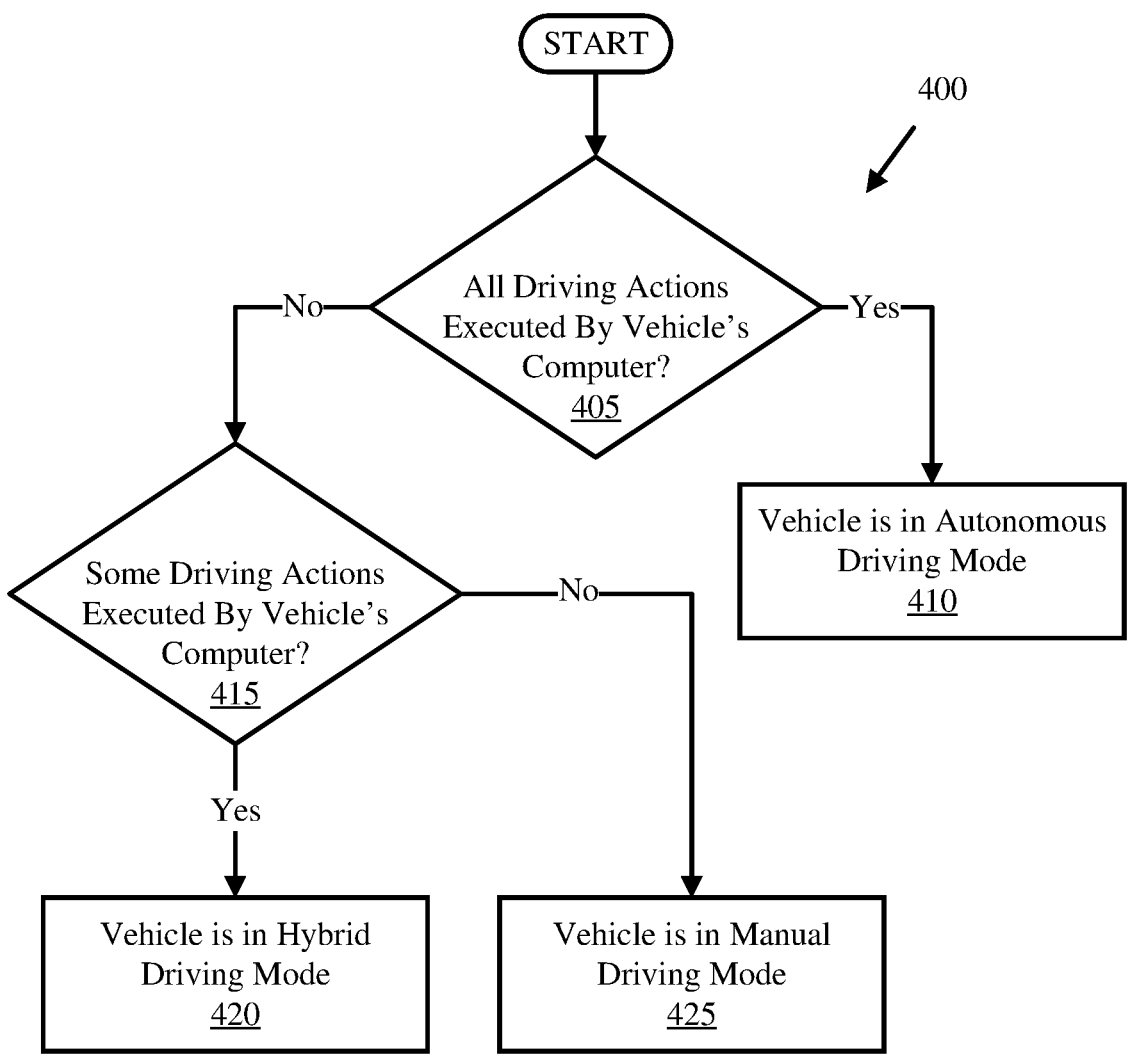
FIG. 4 is a flow diagram illustrating an example method for determining a driving mode of an autonomous vehicle, in accordance with embodiments of the present disclosure.

Referring now to FIG. 4, shown is a flow diagram of an example method 400 for determining a driving mode of an autonomous vehicle, in accordance with embodiments of the present disclosure.

Method 400 initiates at operation 405, where a determination is made whether all driving actions are executed by a vehicle's (e.g., vehicle 110 of FIG. 1 or vehicle 200 of FIG. 2) computer (e.g., one or more processing circuits within the vehicle). In embodiments, this determination can be made by analyzing whether any analogue signals (e.g., indicative of user input) are received by the vehicle's computer. For example, if no analogue signals are received, and only digital signals are received (e.g., by vehicle sensors) and transmitted by the vehicle's computer, then a determination can be made that all driving actions are being executed by the vehicle's computer. If a determination is made that all driving actions are being executed by the vehicle's computer (operation 405: YES), then a determination is made that the vehicle is in the autonomous driving mode. This is illustrated at operation 410.

If a determination is made that all driving actions are not executed by the vehicle's computer (operation 405: NO), then a determination is made, at operation 415, whether some driving actions are executed by the vehicle's computer. For example, if some analogue signals are received (e.g., the user is engaging the throttle and thus an analogue signal is transmitted to the vehicle's computer), yet some driving actions are being completed solely by the vehicle's computer, then a determination is made that some driving actions are executed by the vehicle's computer. In response to determining that some (but not all) driving actions are executed by the vehicle's computer (operation 415: YES), then a determination is made that the vehicle is in the hybrid driving mode. This is illustrated at operation 420. If a determination is made that no driving actions are being executed by the vehicle's computer (operation 415: NO), then a determination is made that the vehicle is in manual driving mode. This is illustrated at operation 425. In some embodiments, determining that the vehicle is in the manual driving mode can be completed by determining that all driving actions are completed in response to receiving analogue signals.

FIG. 4 depicts an exemplary method 400 for determining a driving mode of an autonomous vehicle. However, the driving mode of the vehicle can be determined in a variety of manners. For example, the driving mode of the vehicle can be determined based on manual mode selection, based on analyzing sensor data collected by the vehicle, and/or based on one or more actuators being engaged within the vehicle.

The aforementioned operations can be completed in any order and are not limited to those described. Additionally, some, all, or none of the aforementioned operations can be completed, while still remaining within the spirit and scope of the present disclosure.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
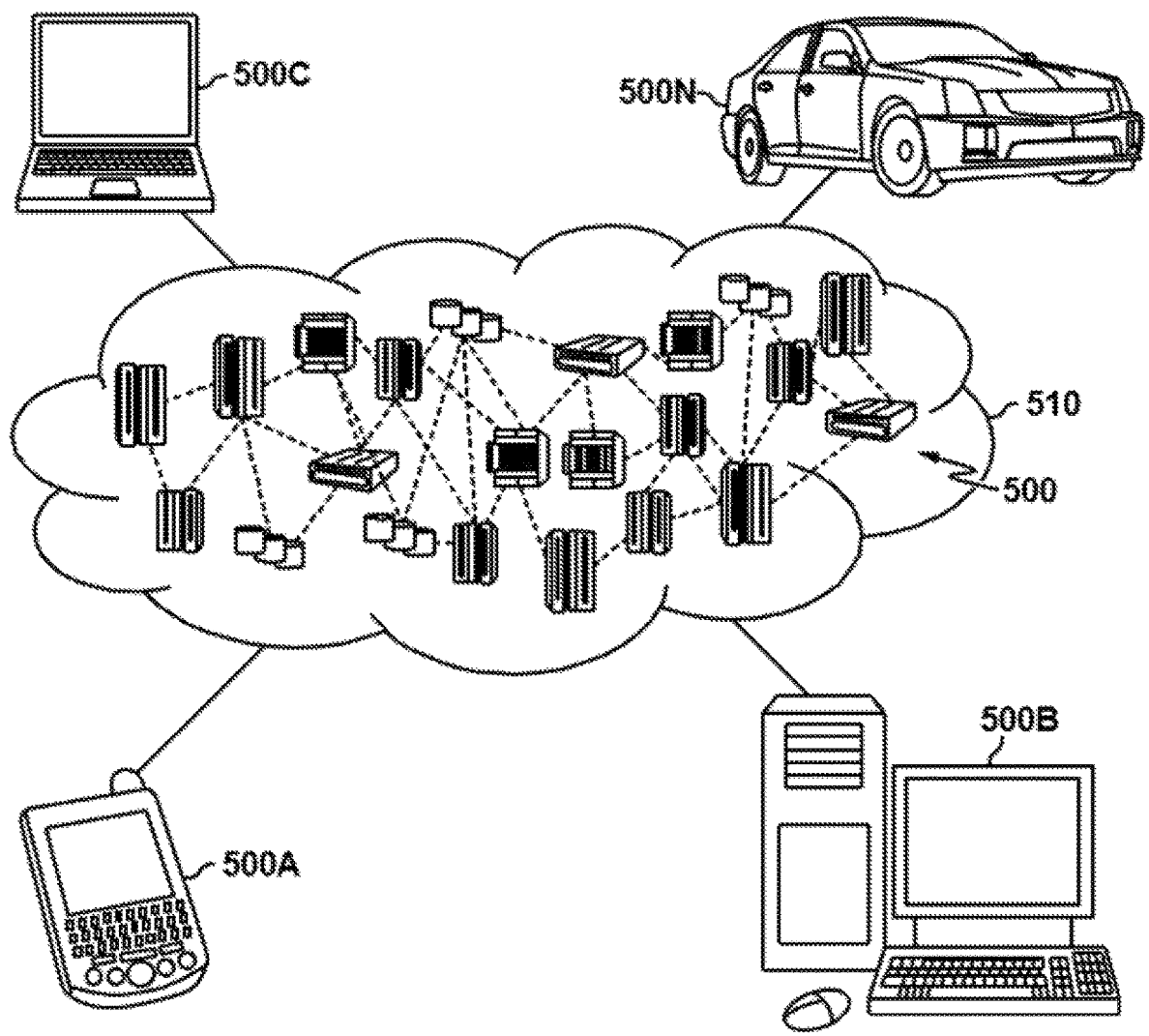
FIG. 5 is a diagram illustrating a cloud computing environment, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A (e.g., user device 234, third party device 238, requesting device 226), desktop computer 500B (e.g., user device 234, third party device 238, requesting device 226), laptop computer 500C, and/or automobile computer system 500N (e.g., vehicles 105, 110, and 200) may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
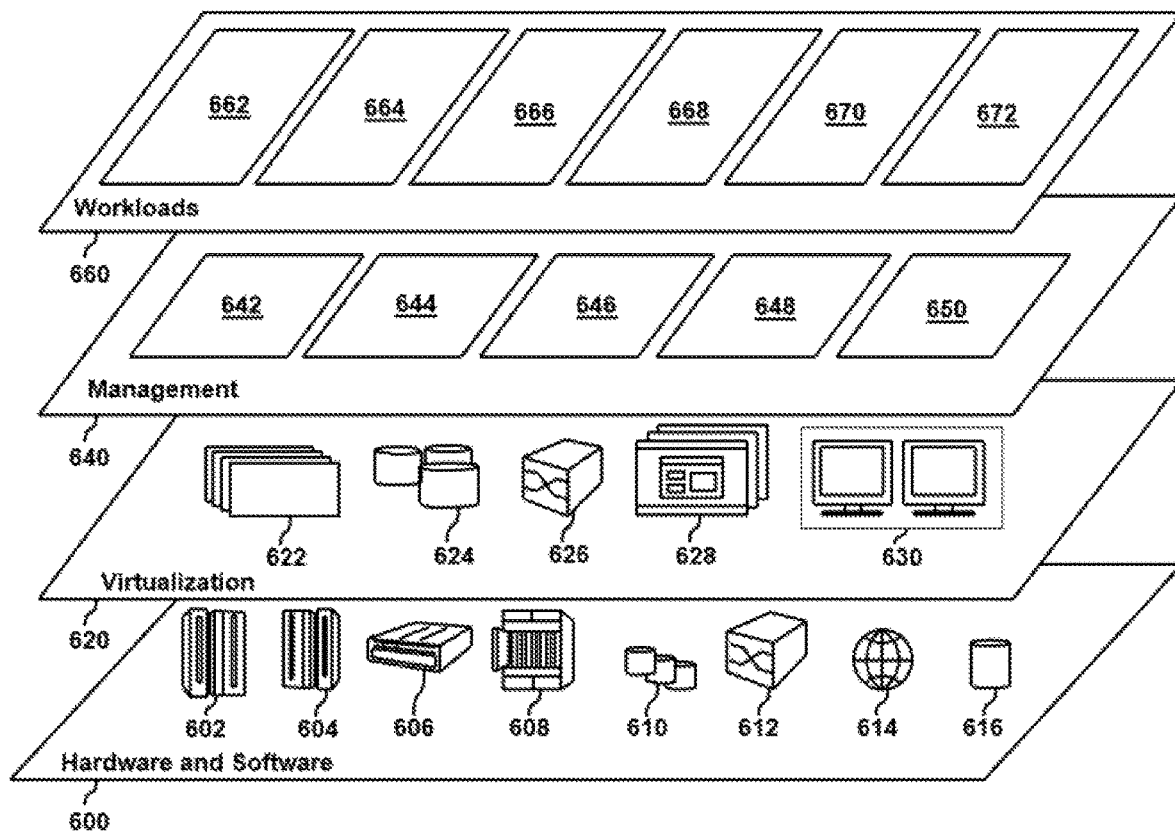
FIG. 6 is a block diagram illustrating abstraction model layers, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 may allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 666; data analytics processing 668; transaction processing 670; and driving mode identification 672.

Figure 7:
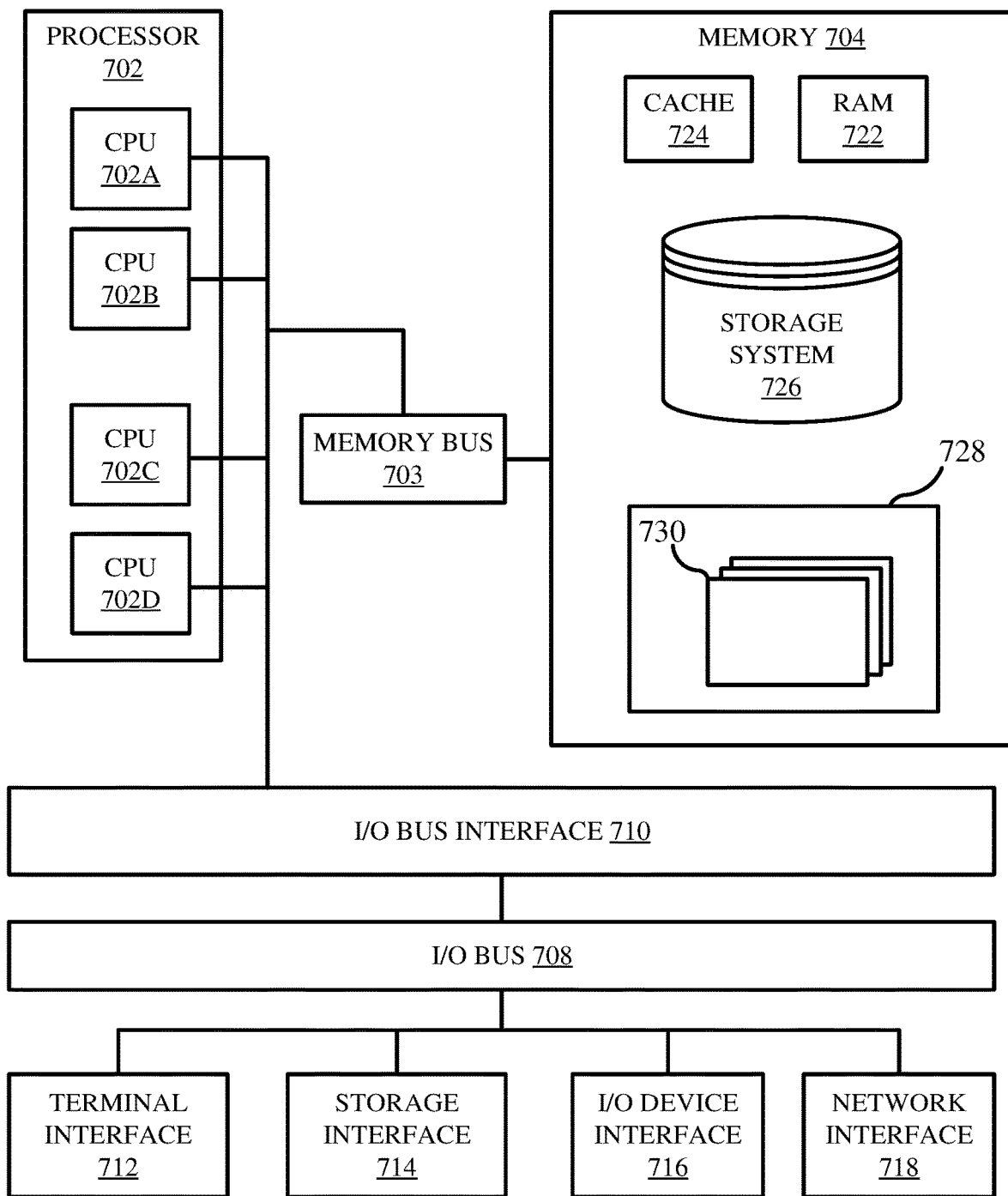
FIG. 7 is a high-level block diagram illustrating an example computer system that may be used in implementing one or more of the methods, tools, and modules, and any related functions, described herein, in accordance with embodiments of the present disclosure.

Referring now to FIG. 7, shown is a high-level block diagram of an example computer system 701 that may possibly be utilized in various devices discussed herein (e.g., vehicles 105, 110, and 200, user device 234, third party device 238, requesting device 226) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

In some embodiments, the program modules 730 of the computer system 701 may include a driving mode identification module. In embodiments, the driving mode identification module can be configured to determine a driving mode of an autonomous vehicle, receive a request for the driving mode of the autonomous vehicle, and transmit the driving mode to the requestor.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   determining, by one or more processing circuits of an autonomous vehicle, a driving mode of the autonomous vehicle, the driving mode representing an amount of autonomy of the autonomous vehicle at a particular time;
   receiving, from a requesting device, a request for an identification of the driving mode of the autonomous vehicle;
   authenticating the requesting device by the one or more processing circuits of the autonomous vehicle; and
   transmitting, in response to receiving the request for the driving mode, the identification of the driving mode to the requesting device.

2. The method of claim 1, wherein the driving mode is determined to be autonomous based on a determination that the one or more processing circuits of the autonomous vehicle are executing all driving actions required to reach a particular destination.

3. The method of claim 1, wherein the driving mode is determined to be hybrid based on a determination that the one or more processing circuits of the autonomous vehicle are only completing a subset of all driving actions required to reach a particular destination.

4. The method of claim 1, wherein the driving mode is determined to be manual based on a selection of a manual driving mode option.

5. The method of claim 1, further comprising:
   recording a time period spent in each of a set of driving modes;
   recording a location in which each of the set of driving modes is activated;
   recording a time of day each of the set of driving modes is activated; and
   storing the time period spent in each of the set of driving modes, the location in which each of the set of driving modes is activated, and the time of day each of the set of driving modes is activated in a vehicle profile associated with the autonomous vehicle.

6. The method of claim 5, wherein the vehicle profile is transmitted to a vehicle profile data store over a network, wherein the vehicle profile data store comprises a plurality of vehicle profiles associated with a plurality of corresponding vehicles.

7. The method of claim 1, wherein the driving mode is stored in a vehicle information data store, wherein the vehicle information data store includes a time spent in the driving mode, a speed of the autonomous vehicle, and a plate number.

8. The method of claim 7, wherein the vehicle information data store is transmitted to the requesting device with the driving mode.

9. A system comprising:
   an autonomous vehicle having one or more processing circuits; and
   a computer-readable storage medium storing instructions, which, when executed by the one or more processing circuits, are configured to cause the one or more processing circuits to perform a method comprising:
   determining a driving mode of the autonomous vehicle, the driving mode representing an amount of autonomy of the autonomous vehicle at a particular time;
   receiving, from a requesting device, a request for an identification of the driving mode of the autonomous vehicle;
   authenticating the requesting device by the one or more processing circuits of the autonomous vehicle; and
   transmitting, in response to receiving the request for the driving mode, the identification of the driving mode to the requesting device.

10. The system of claim 9, wherein the driving mode is determined by analyzing sensor data collected by one or more sensors of the autonomous vehicle.

11. The system of claim 10, wherein the driving mode is determined to be autonomous based on the one or more sensors collecting sensor data required to facilitate control of all driving actions of the autonomous vehicle.

12. The system of claim 10, wherein the driving mode is determined to be hybrid based on a sensor of the one or more sensors not collecting sensor data required to facilitate at least one driving action.

13. The system of claim 10, wherein the driving mode is determined to be manual based on a braking actuator of the autonomous vehicle being manually engaged.

14. A computer program product comprising a computer readable storage medium having program instructions embodied therewith, wherein the computer readable storage medium is not a transitory signal per se, the program instructions executable by one or more processing circuits of an autonomous vehicle to cause the one or more processing circuits to perform a method comprising:

determining a driving mode of the autonomous vehicle, the driving mode representing an amount of autonomy of the autonomous vehicle at a particular time;

receiving, from a requesting device, a request for an identification of the driving mode of the autonomous vehicle;

authenticating the requesting device by the one or more processing circuits of the autonomous vehicle; and transmitting, in response to receiving the request for the driving mode, the identification of the driving mode to the requesting device.

15. The computer program product of claim 14, wherein the driving mode is determined to be autonomous based on a determination that the one or more processing circuits of the autonomous vehicle are executing all driving actions required to reach a particular destination.

16. The computer program product of claim 14, wherein the driving mode is determined to be hybrid based on a determination that the one or more processing circuits of the autonomous vehicle are only completing a subset of all driving actions required to reach a particular destination.

17. The computer program product of claim 14, wherein the driving mode is determined to be autonomous based on a selection of an autonomous driving mode option.

* * * * *